US00RE46239E

(19) United States
(12) Reissued Patent
Kakkori

(10) Patent Number: US RE46,239 E
(45) Date of Reissued Patent: Dec. 13, 2016

(54) METHOD AND SYSTEM FOR IMAGE CONSTRUCTION USING MULTIPLE EXPOSURES

(71) Applicant: Hannu Kakkori, Tampere (FI)

(72) Inventor: Hannu Kakkori, Tampere (FI)

(73) Assignee: CORE WIRELESS LICENSING S.A.R.L., Luxembourg (LU)

(21) Appl. No.: 13/904,351

(22) Filed: May 29, 2013

Related U.S. Patent Documents

Reissue of:
(64) Patent No.: 7,952,612
Issued: May 31, 2011
Appl. No.: 11/474,047
Filed: Jun. 22, 2006

(51) Int. Cl.
*H04N 5/228* (2006.01)
*H04N 5/232* (2006.01)

(52) U.S. Cl.
CPC ..... *H04N 5/23232* (2013.01)

(58) Field of Classification Search
CPC ..... H04N 5/23232; H04N 5/23248; H04N 5/23258; H04N 5/23277; H04N 5/23264; G03B 7/00
USPC ..... 348/208.6
See application file for complete search history.

(56) References Cited

U.S. PATENT DOCUMENTS 5,771,404 A * 6/1998 Katayama et al. ..... 396/52
6,044,228 A * 3/2000 Hara et al. ..... 396/55
6,345,152 B1 * 2/2002 Sato ..... 396/52
6,487,369 B1 * 11/2002 Sato ..... 396/52
6,731,799 B1 * 5/2004 Sun et al. ..... 382/173
7,209,601 B2 4/2007 Manabe ..... 382/294
7,307,653 B2 12/2007 Dutta ..... 348/208.7
2003/0151688 A1 * 8/2003 Tojo ..... 348/345
2004/0160525 A1 8/2004 Kingetsu et al. ..... 348/364
2004/0239775 A1 * 12/2004 Washisu ..... 348/239
2005/0248660 A1 * 11/2005 Stavely et al. ..... 348/208.16
2007/0014554 A1 * 1/2007 Sasaki et al. ..... 396/55
2008/0052090 A1 * 2/2008 Heinemann et al. ..... 705/1
2009/0009612 A1 1/2009 Tico et al. ..... 348/208.1
2009/0175496 A1 * 7/2009 Kondo et al. ..... 382/103

FOREIGN PATENT DOCUMENTS

CN 1638440 A 7/2005
EP 1304872 A1 4/2003
(Continued)

*Primary Examiner* — Usman Khan
(74) *Attorney, Agent, or Firm* — Core Wireless Licensing, LTD.

(57) ABSTRACT

A motion sensor is used to sense the movement of the camera during an exposure period. The camera has an image sensor to form one or more exposures. When the movement is within a certain range, the exposures are used to provide one or more frames so that an image can be constructed based on the frames. In one embodiment, the exposure period is divided into several short intervals in order to capture several image frames and only the image frames captured when the position of the camera is within a predetermined range are used to form the final image. The exposure time for each frame is small in order to reduce the motion blur degradation of the individual frames. If the camera is stable and substantially stationary relative to the scene, then all or many of the shorter frames are used to form the final image.

42 Claims, 6 Drawing Sheets

(56) References Cited

FOREIGN PATENT DOCUMENTS

| | | | |
|---|---|---|---|
| EP | 1501288 | A2 | 1/2005 |
| GB | 2253067 | A | 8/1992 |
| JP | 09-005816 | | 1/1997 |
| JP | 11317904 | A | 11/1999 |
| JP | 2001-166351 | | 6/2001 |
| JP | 2001166351 | A | 6/2001 |
| JP | 2002116477 | A | 4/2002 |
| JP | 2002118780 | | 4/2002 |
| JP | 2002-311471 | A | 10/2002 |
| JP | 2003-101862 | | 4/2003 |
| JP | 2003101862 | A | 4/2003 |
| JP | 2004-007220 | A | 1/2004 |
| JP | 2004-201247 | A | 7/2004 |
| JP | 2004312663 | | 11/2004 |
| JP | 2005-197911 | A | 7/2005 |
| WO | WO-2007/031808 | A1 | 3/2007 |

* cited by examiner

FIG. 1
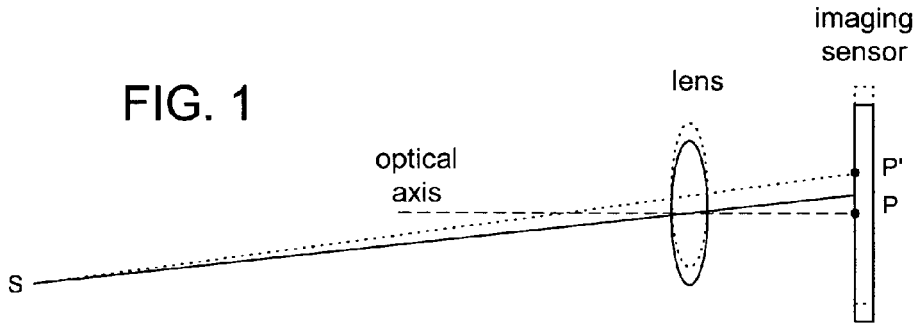
FIG. 2
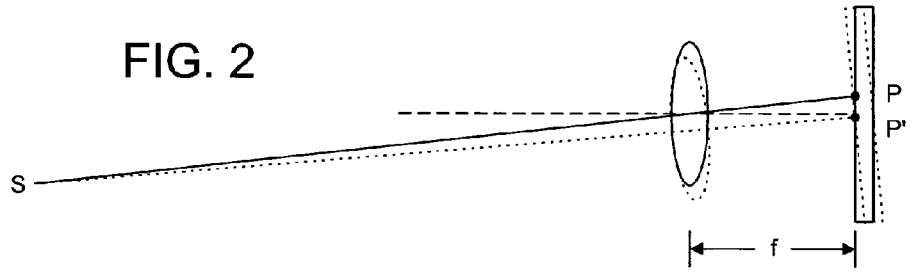
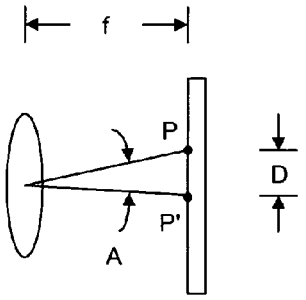
FIG. 3
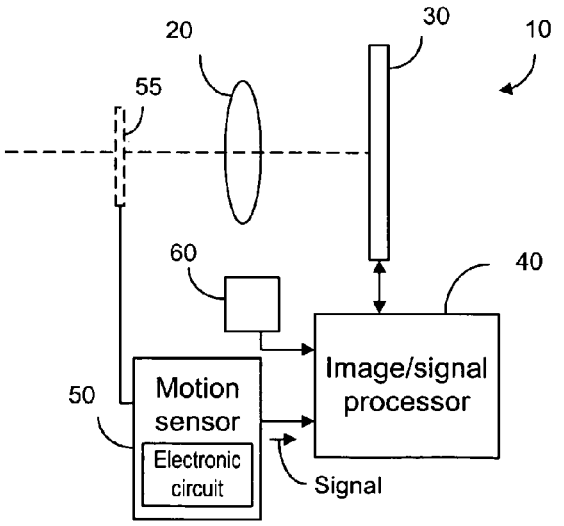
FIG. 8

METHOD AND SYSTEM FOR IMAGE CONSTRUCTION USING MULTIPLE EXPOSURES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates generally to image stabilization and, more particularly, to image stabilization by image processing.

BACKGROUND OF THE INVENTION

The problem of image stabilization dates back to the beginning of photography, and the problem is related to the fact that an image sensor needs a sufficient exposure time to form a reasonably good image. Any motion of the camera during the exposure time causes a shift of the image projected on the image sensor, resulting in a degradation of the formed image. The motion related degradation is called motion blur. Using one or both hands to hold a camera while taking a picture, it is almost impossible to avoid an unwanted camera motion during a reasonably long exposure or integration time. Motion blur is particularly easy to occur when the camera is set at a high zoom ratio when even a small motion could significantly degrade the quality of the acquired image. One of the main difficulties in restoring motion blurred images is due to the fact that the motion blur is different from one image to another, depending on the actual camera motion that took place during the exposure time.

The ongoing development and miniaturization of consumer devices that have image acquisition capabilities increases the need for robust and efficient image stabilization solutions. The need is driven by two main factors:

1. Difficulty to avoid unwanted motion during the integration time when using a small hand-held device (like a camera phone).

2. The need for longer integration times due to the small pixel area resulting from the miniaturization of the image sensors in conjunction with the increase in image resolution. The smaller the pixel area the fewer photons per unit time could be captured by the pixel such that a longer integration time is needed for good results.

Image stabilization is usually carried out in a technique called a single-frame solution. The single-frame solution is based on capturing a single image frame during a long exposure time. This is actually the classical case of image capturing, where the acquired image is typically corrupted by motion blur, caused by the motion that has taken place during the exposure time. In order to restore the image it is necessary to have very accurate knowledge about the motion that took place during the exposure time. Consequently this approach might need quite expensive motion sensors (gyroscopes), which, apart of their costs, are also large in size and hence difficult to include in small devices. In addition, if the exposure time is long then the position information derived from the motion sensor output exhibits a bias drift error with respect to the true value. This error accumulates in time such that at some point may affect significantly the outcome of the system.

In the single-frame solution, a number of methods have been used to reduce or eliminate the motion blur. Optical image stabilization generally involves laterally shifting the image projected on the image sensor in compensation for the camera motion. Shifting of the image can be achieved by one of the following four general techniques:

Lens shift—this optical image stabilization method involves moving one or more lens elements of the optical system in a direction substantially perpendicular to the optical axis of the system;

Image sensor shift—this optical image stabilization method involves moving the image sensor in a direction substantially perpendicular to the optical axis of the optical system;

Liquid prism—this method involves changing a layer of liquid sealed between two parallel plates into a wedge in order to change the optical axis of the system by refraction; and Camera module tilt—this method keeps all the components in the optical system unchanged while tilting the entire module so as to shift the optical axis in relation to a scene.

In any one of the above-mentioned image stabilization techniques, an actuator mechanism is required to effect the change in the optical axis or the shift of the image sensor. Actuator mechanisms are generally complex, which means that they are expensive and large in size.

Another approach to image stabilization is the multi-frame method. This method is based on dividing a long exposure time into several shorter intervals and capturing several image frames of the same scene in those shorter intervals. The exposure time for each frame is small in order to reduce the motion blur degradation of the individual frames. After capturing all these frames, the final image is calculated in two steps:

Registration step: register all image frames with respect to one of the images chosen as reference, and Pixel fusion: calculate the value of each pixel in the final image based on the corresponding values in all individual frames. One simple method of pixel fusion could be to calculate the final value of each pixel as the average of its values in the individual frames.

The main problems in a typical multi-frame image stabilization solution include:

1. Complex computation in image registration, and
2. Moving objects in the scene: If there are objects in the scene that are moving during the time the image frames are acquired, these objects are distorted in the final image. The distortion consists in pasting together multiple instances of the objects.

It is desirable to provide a simpler method and system for image stabilization.

SUMMARY OF THE INVENTION

The present invention relates to the multi-frame method based on capturing a single image frame or several image frames of the same scene in shorter intervals. The number of captured frames is determined by the motion blur caused by the camera motion and the implementation of embodiments.

According to one embodiment of the present invention, a long exposure time is divided into several short intervals in order to capture a plurality of image frames and only the image frames that are captured when the position of the camera is within a predetermined range are used to form a final image. The exposure time for each frame is small in order to reduce the motion blur degradation of the individual frames. If the camera is stable and substantially stationary relative to the scene, then all or many of the shorter frames are used to form the final image. If the camera is not sufficiently stable, then one or a few shorter frames are used.

According to other embodiments, the duration of exposures to the image sensor is determined by the camera motion during the exposures. Multiple captured frames from multiple exposures may be used to form a final image. Alternatively, only a single frame is captured from the multiple exposures and that single frame is used to form the final image.

If multiple frames are used to form the final image, the pixel intensity values of the corresponding pixels in the frames are summed in order to obtain the final image. The summing process can be done in the image sensor or in a processor.

The present invention uses a motion sensor to sense the camera movement during the exposure time. If the camera movement exceeds a predetermined range relative to a reference point, then the shorter frames captured during this large movement period are discarded. Alternatively, the image sensor is effectively not exposed during a large movement period. The exposing light can be shut off by a mechanical shutter, by an optical valve or by an electronic circuit in the image sensor. With the frame selection or with the selective exposure method of the present invention, there is no need to optically or electronically shift the images captured in the shorter frames in the pixel fusion process.

Thus, it is a first aspect of the present invention to provide a method to stabilize an image acquired in an imaging system during an exposure period. The method comprises:

exposing a projected image on an image sensor of the imaging system at least part of the exposure period for attaining one or more exposures;

sensing movement of the imaging system during the exposure period for obtaining a movement amount relative to an initial position of the imaging system in the exposure period; and constructing the acquired image based on one or more exposures attained when the movement amount is within a predetermined movement range in the exposure period.

According to one embodiment, the one or more exposures attained when the movement amount is within the predetermined movement range form a single image frame during the exposure period, and the method further comprises capturing the single image frame after the exposure period for constructing the acquired image.

According to another embodiment, one or more exposures attained when the movement amount is within the predetermined movement range separately form one or more image frames during the exposure period, and the method further comprises capturing the image frames at least during the exposure period for constructing the acquired image.

According to a different embodiment, the exposure period is divided into a plurality of shorter time periods and said one or more exposures attained during at least part of the exposure period form one or more image frames, each image frame for one shorter time period, said method further comprising capturing said one or more image frames at least during the exposure period; and selecting the captured image frames formed from the one or more exposures when the movement amount is within the predetermined movement range for constructing the acquired image.

It is a second aspect of the present invention to provide an imaging system which comprises:

an image sensor for attaining one or more exposures during an exposure period;

a movement sensor for sensing movement of the imaging system during the exposure period for obtaining a movement amount relative to an initial position of the imaging system in the exposure period; and a processor, operatively connected to the image sensor, for constructing an image based on one or more exposures attained when the movement amount is within a predetermined movement range.

The imaging system further comprises an optical system for providing a projected image on the image sensor so as to allow the image sensor to attain the one or more exposures during the exposure period, and a shutter, positioned in relationship to the optical system, for preventing the projected image from reaching the image sensor when the movement amount is outside the predetermined movement range Alternatively, the imaging system further comprises an electronic circuit operatively connected to the image sensor for preventing the image sensor from attaining an exposure when the movement amount is outside the predetermined movement range. The electronic circuit can provide a signal to indicate whether the movement amount is within the predetermined movement range so as to allow the image sensor to attain said one or more exposures only when the movement amount is within the predetermined range.

It is a third aspect of the present invention to provide an image stabilization module for use in an imaging system, wherein the imaging system comprises an image sensor, an optical module for projecting an image on the image sensor so as to allow the image sensor to attain one or more exposures during an exposure period, and a processor, operatively connected to the image sensor, for constructing an image based on one or more exposures. The image stabilization module comprises:

a movement sensor for sensing movement of the imaging system during the exposure period; and means, operatively connected to the movement sensor, for determining a movement amount of the imaging system relative to an initial position of the imaging system in the exposure period, and for providing a signal indicative of wherein the movement amount is within a predetermined movement range to the processor so that the processor attains the one or more exposures only when the movement amount is within the predetermined range.

It is possible that a light shutter is used for preventing the projected image from reaching the image sensor when the movement amount is out of the predetermined movement range.

The present invention will become apparent upon reading the description taken in conjunction with FIGS. 1 to 9.

BRIEF DESCRIPTION OF THE DRAWINGS

FIG. 1 shows a shift in the image on the image sensor due to a linear movement of the camera.

FIG. 2 shows a shift in the image on the image sensor due to a rotational movement of the camera.

FIG. 3 shows the relationship of the distance of an image shift to the angular change of the image shift.

FIG. 8 is a schematic representation showing the motion stabilization system, according to the present invention.

DETAILED DESCRIPTION OF THE INVENTION

Figure 4A:
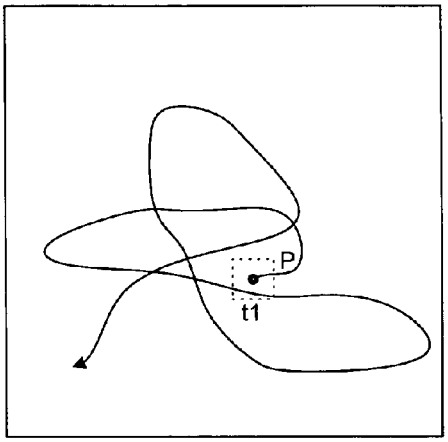
FIG. 4a illustrates a track of a projected image spot on the image plane due to the camera movement.

Using a small hand-held device, such as camera phone to take a picture, the movement of the device relative to a scene is most of the time unavoidable. If the exposure time is long, image blur occurs. Image blur is the result of the image shift in the image plane. As shown in FIG. 1, an image point P on the image sensor is shifted to point P' due to a linear movement of the camera relative to a point S in the scene. FIG. 2 shows the image shift due to a rotational movement of the camera relative to point S. If the image shift distance, D, between point P and point P' is larger than three or four pixels, then the image quality may be poor. Thus, it is desirable to limit the camera movement such that the image shift is within a predetermined range, say one or two pixels. The image shift distance not only varies with the camera movement, but also with the focal distance, f, between the image plane and the lens. In a camera with a zoom lens, the image shift distance is greater when the lens is zoomed out.

The image shift distance, D, can be related to a shift angle, $\alpha$, as shown in FIG. 3. The shift angle, $\alpha$, is approximately equal to D/f. With the same amount of camera movement, the shift angle, $\alpha$, does not significantly change with the focal distance, f.

If the camera is not stable during the long exposure time, an image point P in the image plane may move around responding to the camera movement relative to the scene. In general, the user of the camera tries to aim the camera at the scene. Thus, although the camera moves during the long exposure time, the same image does not wander very far from the image point P. FIGS. 4a to 4d illustrate a track of an image point during the long exposure time. When the track crosses itself, this indicates that the camera moves back to the same aiming direction or position after moving away from it. However, the track may or may not cross the initial image point P.

The image stabilization method, according to the present invention, relates to the multi-frame method based on capturing a single image frame or several image frames of the same scene in shorter intervals. The number of captured frames is determined by the motion blur caused by the camera motion and the implementation of embodiments.

According to one embodiment of the present invention, a long exposure time is divided into a plurality of several short intervals in order to capture a plurality of image frames and only the image frames captured when the position of the camera is within a predetermined range are used to form a final image. The exposure time for each frame is small in order to reduce the motion blur degradation of the individual frames. If the camera is stable and substantially stationary relative to the scene, then all or many of the shorter frames are used to form the final image. If the camera is not sufficiently stable, then one or a few shorter frames are used.

According to other embodiments, the duration of exposures to the image sensor is determined by the camera motion during the exposures. Multiple captured frames from multiple exposures may be used to form a final image. Alternatively, only a single frame is captured from the multiple exposures and that single frame is used to form the final image.

As shown in FIG. 4a, although the track does not pass the image point P during a certain exposure time, it may pass through the pixel where the image point P is initially located. The pixel is indicated by the area defined by a dotted rectangle and the track passes through the pixel at $t_1$. In this case, at least the initial shorter frame and the shorter frame at $t_1$ can be used to form the final image. Let us call the area defined by the dotted rectangle a "wanted exposure area".

Figure 4B:
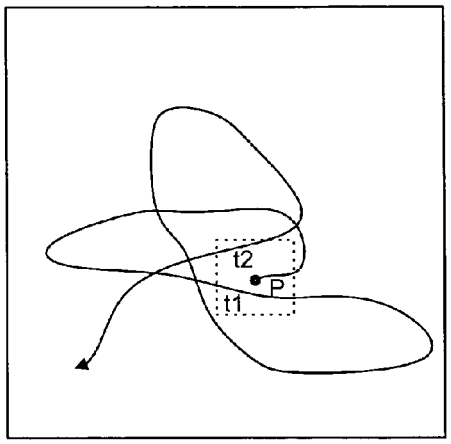
FIG. 4b illustrates the track of a projected image spot on the image plane and a different wanted exposure area.

According to the present invention, some or all of the shorter frames in which the track of an image point passes through the wanted exposure area are used to form the final image. The sharpness of the final image depends upon how large the wanted exposure area is. In a digital camera, the smaller wanted exposure area is a pixel. However, the wanted exposure area can be larger than a pixel. When the wanted exposure area is increased, it is more likely that the track passes through the wanted exposure area. As shown in FIG. 4b, the track passes the wanted exposure area again at $t_2$. Thus, at least three shorter frames can be used to form the final image.

Figure 4C:
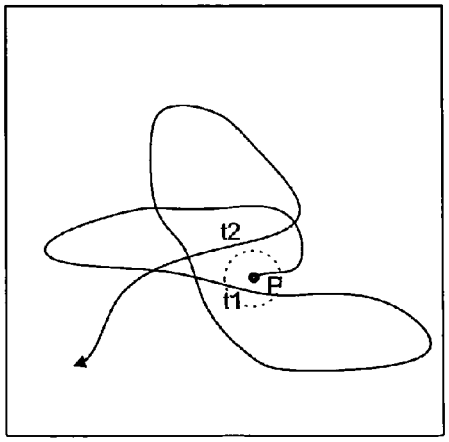
FIG. 4c illustrates the track of a projected image spot on the image plane and another wanted exposure area.
Figure 4D:
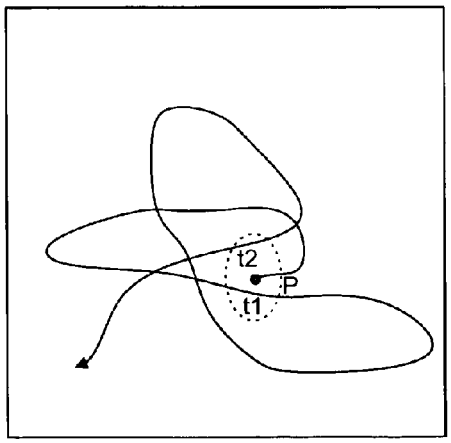
FIG. 4d illustrates the track of a projected image spot on the image plane and yet another wanted exposure area.

Alternatively, a wanted exposure angular range, instead of the wanted exposure area, can be used for selecting shorter frames in forming the final image. The wanted exposure angular range can be defined by the wanted exposure area divided by the focal distance, f, of the camera. In FIG. 4c, the wanted exposure angular range is bound by a dotted circle. In FIG. 4d, the wanted exposure angular range is bound by a dotted ellipse.

Figure 5:
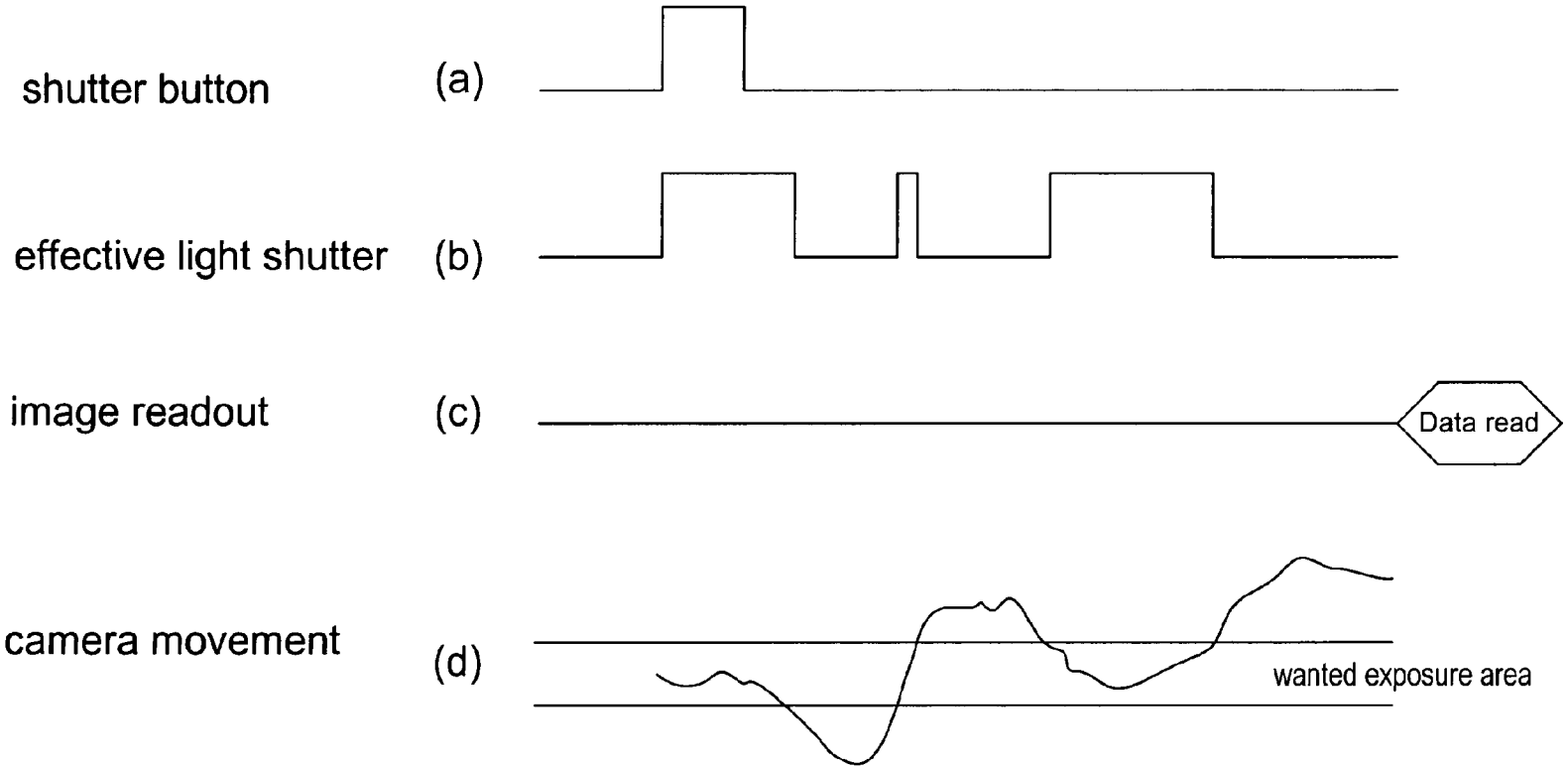
FIG. 5 is a time-chart illustrating how the exposures are read out, according to one embodiment of the present invention.
Figure 6:
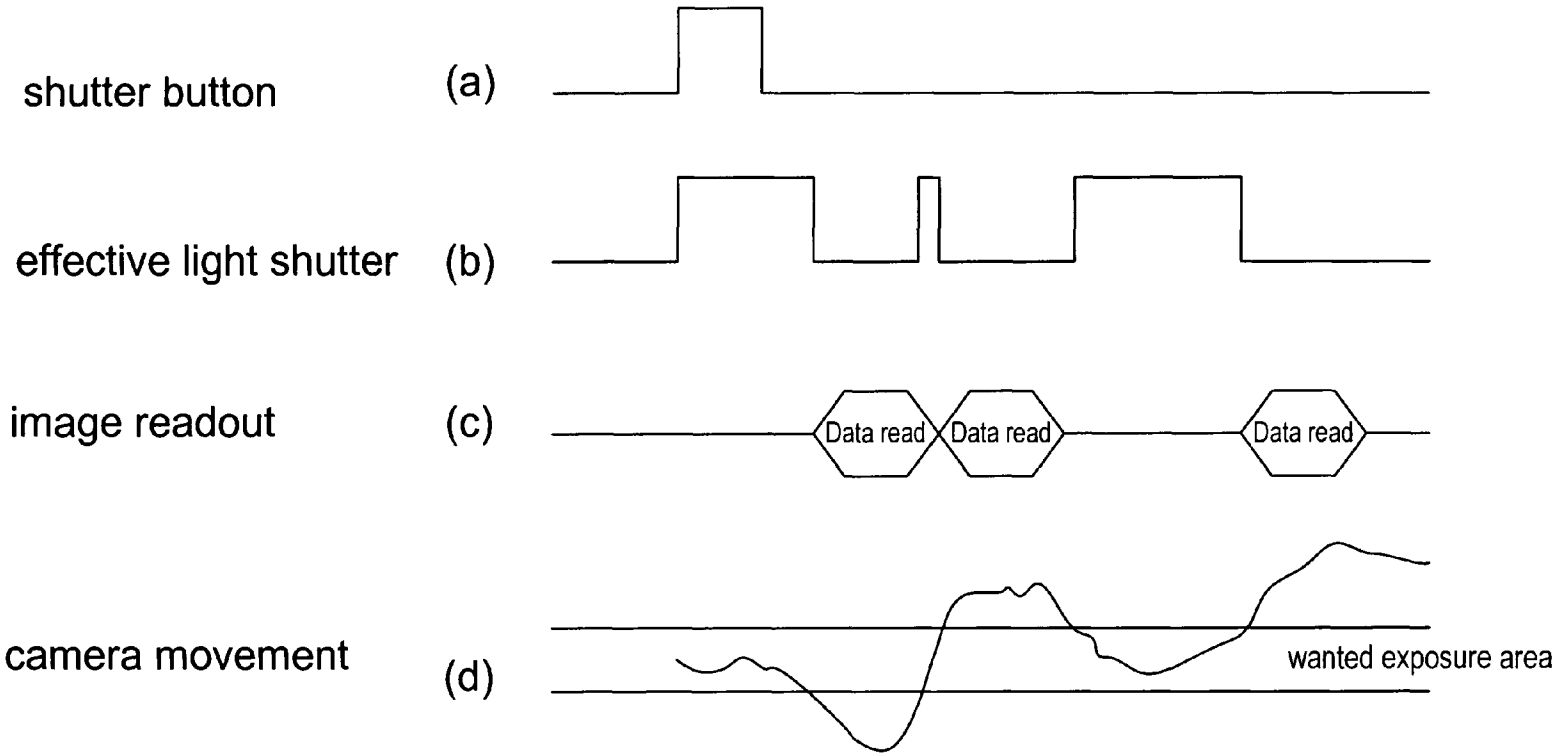
FIG. 6 is a time-chart illustrating how the exposures are read out, according to another embodiment of the present invention.
Figure 7:
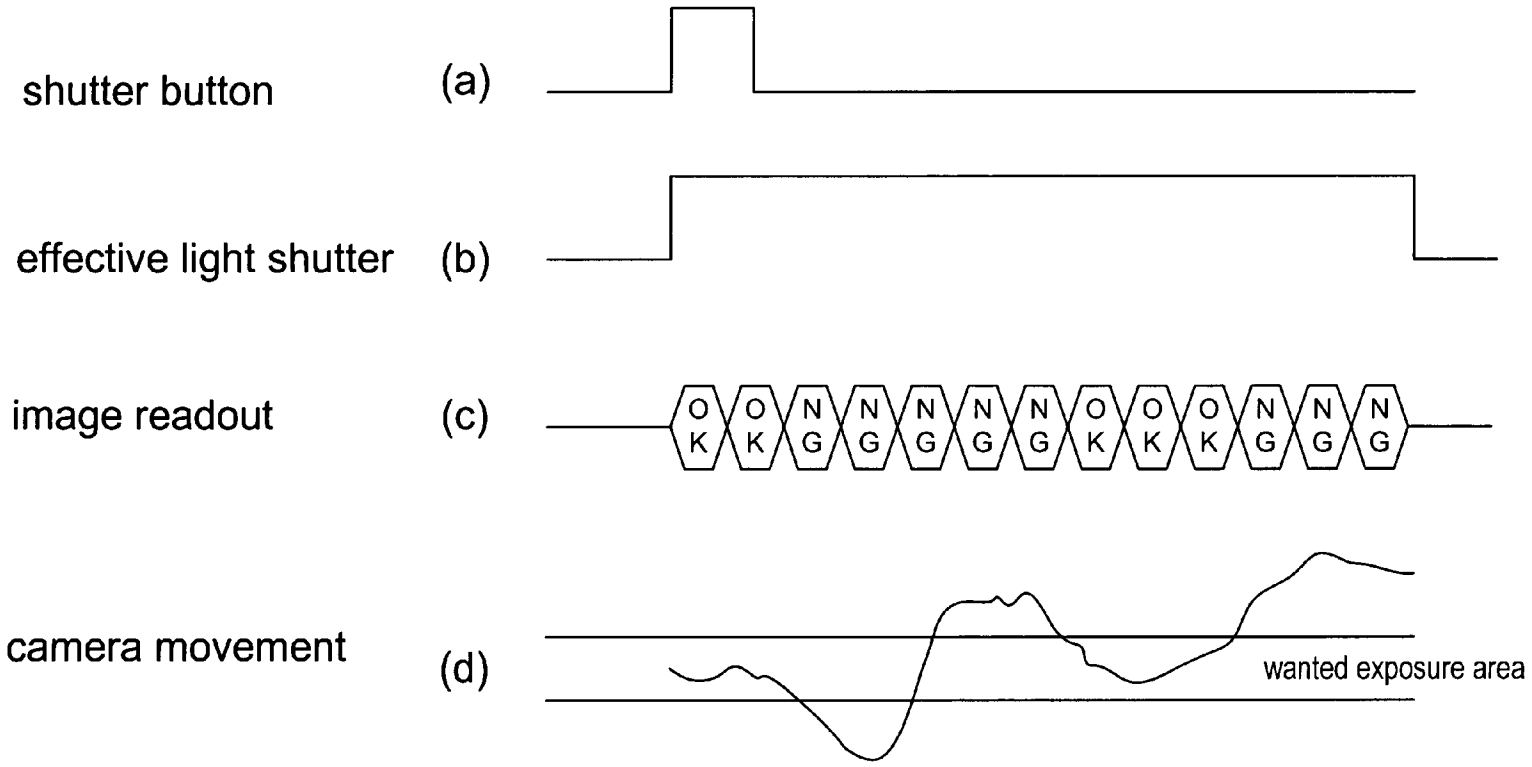
FIG. 7 is a time-chart illustrating how the exposures are read out, according to yet another embodiment of the present invention.

It should be noted that, with the same camera movement, there are more than one way to form a final image, as shown in FIGS. 5 to 7. The camera movement is shown in FIGS. 5(d), 6(d) and 7(d). As shown, some part of the camera movement is within a predetermined range depicted as the "wanted exposure area" (or angle). Only the exposures to the image sensor when the camera movement is within the predetermined range are used. The exposures start when the shutter button on the camera is activated, as shown in FIGS. 5(a), 6(a) and 7(a). In FIGS. 5(b) and 6(b), the image sensor is effectively exposed only when the camera movement is within the predetermined range. If the camera movement is outside the predetermined range, the exposing light is shut off by a mechanical or optical shutter, or by an electronic circuit or a plurality of electronic elements within the image sensor. In an image sensor such as a charge-couple device (CCD), electric charges will accumulate in the pixels over an exposure period to form an image. In general, the accumulated charges in each pixel are read out as pixel intensity. After each exposure period, a frame is captured, as shown in FIG. 6(c). As shown in FIG. 6(d), the track of the camera movement moves out of the wanted exposure area three times and, therefore, there are three exposures after the shutter button is activated. Accordingly, three frames are separately and individually captured to be used in the final image. In this embodiment, the pixel intensities are summed in a processor operatively connected to the image sensor.

Alternatively, only a single frame is read out after the picture is taken, as shown in FIG. 5(c). This single frame effectively sums the pixel intensities in three different exposure periods.

In a different embodiment, the long exposure period for taking a picture is divided into a plurality of short periods and a frame is captured for the exposure in each short period. The image for each captured frame is read out while the picture is taken. As shown in FIG. 7(c), only the frames captured for the exposures when the camera movement is within the predetermined range are used for summing. In FIG. 7(c), the used frames are labeled "OK" and the discarded frames are labeled "NG". In this embodiment, the pixel intensities of the used frames are summed in a processor operatively connected to the image sensor. Although FIG. 7(b) shows an effective light shutter period, no shutter is needed for this embodiment.

In order to select the shorter frames for forming a final image, the present invention uses a motion sensor, such as a gyroscope or an accelerometer, to selectively shut off the image sensor when the camera motion is out of the wanted exposure angular range or out of the wanted exposure area in regard to the initial position. As shown in FIG. 8, the imaging system 10 of the present invention comprises one or more lenses 20 to project an image on the image sensor 30. An image/signal processor 40 is configured to read out the images formed on the image sensor. When the illumination is adequate, one short frame may be sufficient to capture the image of a scene. In a low light situation, many short frames are used to capture a plurality of short exposure images so that the pixel intensities in the short frames can be summed by the image/signal processor 40 to form a final image. A motion sensor 50, operatively connected to the image/signal processor 40, sends a signal to the processor 40 to effectively shut off the image sensor 30 when the camera movement is out of the wanted exposure angular range or the wanted exposure area. The exposing light can be shut off by a mechanical shutter or an optical valve 55, for example.

In many imaging systems, the exposure time varies with the illumination. A longer exposure time is used when the illumination is lower. For that purpose, a light sensor 60 is used. In the imaging system, according to the present invention, the exposure time can also be dependent upon the illumination. Thus, in a low light situation, the exposure time can be increased so as to increase the chance for the track of an image point to pass through the wanted exposure area or angular range. However, it is also possible to increase the wanted exposure angular range or the wanted exposure area in a low light situation.

Figure 9:
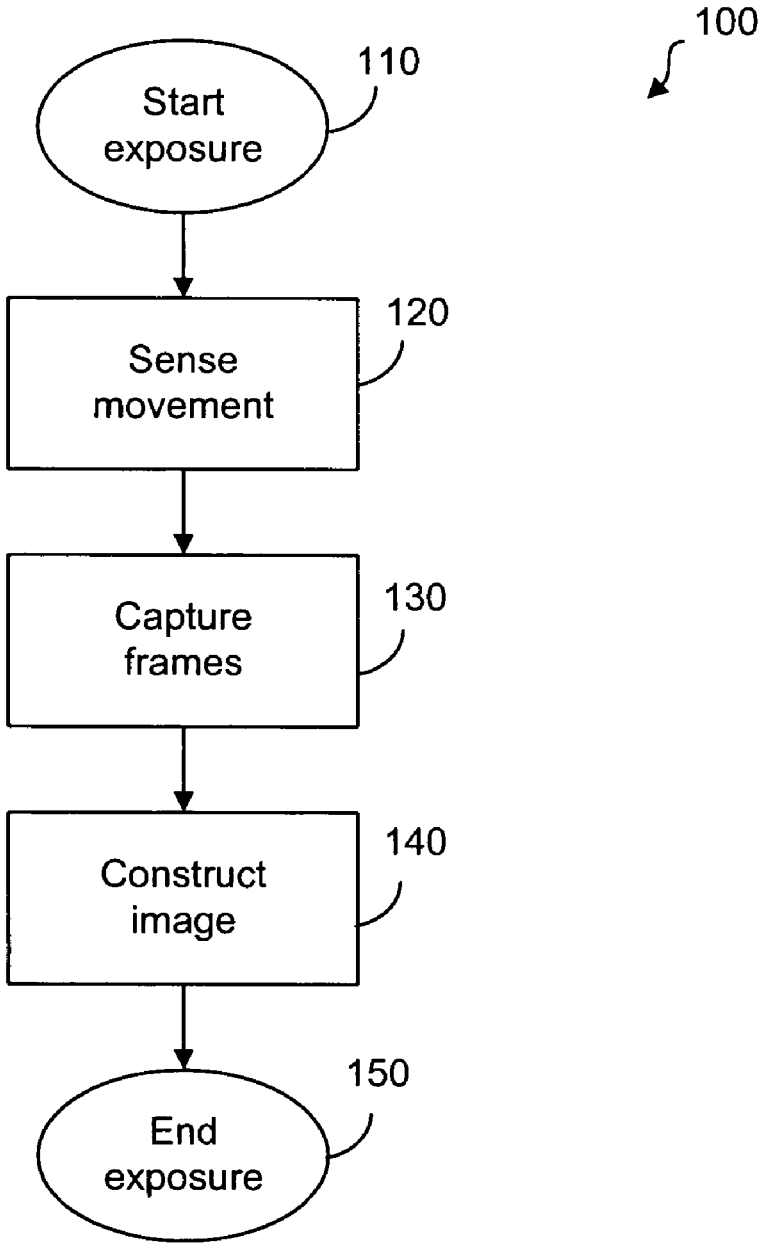
FIG. 9 is a flowchart illustrating the method of image stabilization, according to the present invention.

In sum, the present invention uses a single captured frame or a plurality of captured frames to form a final image. If multiple frames are used to form the final image, the pixel intensity values of the corresponding pixels in the frames are summed in order to obtain the final image. The summing process can be done in the image sensor or in a processor. The overall stabilization process is summarized in a flowchart as shown in FIG. 9. As shown in the flowchart 100 in FIG. 9, the exposures of a projected image to image sensor start at step 110 when the shutter button on the camera is activated. The sensing of the camera movement starts immediately at step 120 in order to determine whether the camera movement is within a wanted exposure area or angle. The image frames are captured at step 130 either during the exposure period or during the exposure period. At step 140, the image frames formed from the exposures when the movement is within the wanted exposure area or angle are used to construct the final image. In one embodiment of the present invention, the projected image is prevented from reaching the image sensor when the movement exceeds the wanted exposure area or angle. It is advantages that the movement of the camera is determined using only a subset of pixels on the image sensor.

The present invention uses a motion sensor to sense the camera movement during the exposure time. If the camera movement exceeds a predetermined range relative to a reference point, then the shorter frames captured during this large movement period are discarded. Alternatively, the image sensor is effectively not exposed during a large movement period. The exposing light can be shut off by a mechanical shutter, by an optical valve or by an electronic circuit in the image sensor. With the frame selection or with the selective exposure method of the present invention, there is no need to optically or electronically shift the images captured in the shorter frames in the pixel fusion process.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method comprising:

exposing a projected image on an image sensor of an imaging system during at least part of an exposure period for attaining at least two exposures;

sensing movement of the imaging system, during the exposure period, in order to determine an amount of movement of the imaging system relative to an initial position of the imaging system in the exposure period; and constructing an image based on at least a first exposure and a second exposure, wherein the first exposure is attained during a first time period, within the exposure period, in which the determined amount of movement of the imaging system is within a predetermined movement range relative to the initial position of the imaging system, the second exposure is attained during a second time period, within the exposure period, in which the determined amount of movement of the imaging system is within the predetermined movement range relative to the initial position of the imaging system, and between the first time period and the second time period there is a third time period in which the determined amount of movement of the imaging system is outside the predetermined movement range relative to the initial position of the imaging system.

2. A method according to claim 1, wherein the first exposure and the second exposure, attained when the determined amount of movement of the imaging system is within the predetermined movement range relative to the initial position of the imaging system, form a single image frame during the exposure period, said method further comprising:

capturing the single image frame after the exposure period for constructing the acquired image.

3. A method according to claim 1, wherein the first exposure and the second exposure, attained when the determined amount of movement of the imaging system is within the predetermined movement range relative to the initial position of the imaging system, separately form at least two image frames during the exposure period, said method further comprising:

capturing the at least two image frames at least during the exposure period for constructing the acquired image.

4. A method according to claim 1, wherein the exposure period is divided into a plurality of shorter time periods and wherein the first exposure, attained during the first time period, forms a first image frame; and the second exposure, attained during the second time period, forms a second image frame, said method further comprising:

capturing said first and second image frames during the exposure period; and selecting at least the first image frame and the second image frame for use in constructing the image.

5. A method according to claim 1, further comprising preventing the projected image from reaching the image sensor, during the third time period, when the determined amount of movement of the imaging system is outside the predetermined movement range relative to the initial position of the imaging system.

6. A method according to claim 1, wherein the image sensor comprises an array of pixels, each pixel having a pixel area, and the predetermined movement range is determined based on one or more pixel areas.

7. A method according to claim 1, wherein the imaging system comprises an optical system for providing the projected image on the image sensor, and the predetermined movement range is determined based on a focal distance of the optical system.

8. A method according to claim 1, wherein the predetermined movement range is determined based on brightness of at least part of light forming the projected image.

9. An imaging system comprising:

an image sensor configured to attain at least a first exposure and a second exposure during an exposure period;

a movement sensor configured to sense movement of the imaging system, during the exposure period, in order to enable an amount of movement of the imaging system to be determined, relative to an initial position of the imaging system in the exposure period; and a processor configured to construct an image based on at least the first exposure and the second exposure, wherein the first exposure is attained during a first time period, within the exposure period, in which the determined amount of movement of the imaging system is within a predetermined movement range relative to the initial position of the imaging system, the second exposure is attained during a second time period, within the exposure period, in which the determined amount of movement of the imaging system is within the predetermined movement range relative to the initial position of the imaging system, and between the first time period and the second time period there is a third time period in which the determined amount of movement of the imaging system is outside the predetermined movement range relative to the initial position of the imaging system.

10. An imaging system according to claim 9, wherein the first exposure and the second exposure, attained when the determined amount of movement of the imaging system is within the predetermined movement range relative to the initial position of the imaging system, form a single image frame during the exposure period, and wherein the image is constructed based on the single image frame captured after the exposure period.

11. An imaging system according to claim 9, wherein the first exposure and the second exposure, attained when the determined amount of movement of the imaging system is within the predetermined movement range relative to the initial position of the imaging system, separately form at least two image frames during the exposure period, and wherein the image is constructed based on the at least two image frames captured at least during the exposure period.

12. An imaging system according to claim 9, wherein the image sensor is configured to divide the exposure period into a plurality of shorter time periods and the first exposure, attained during the first time period, forms a first image frame; and the second exposure, attained during the second time period, forms a second image frame, and wherein the processor is configured to capture the first and second and third image frames during the exposure period, configured to select the first image frame and the second image frame for use in constructing the image.

13. An imaging system according to claim 9, further comprising an optical system for providing a projected image on the image sensor so as to allow the image sensor to attain the first exposure and the second exposure during the exposure period.

14. An imaging system according to claim 13, further comprising a shutter, positioned in relationship to the optical system, configured to prevent the projected image from reaching the image sensor during the third time period, when the determined amount of movement of the imaging system is outside the predetermined movement range relative to the initial position of the imaging system.

15. An imaging system according to claim 9, further comprising an electronic circuit configured to prevent the image sensor from attaining the third exposure during the third time period, when the determined amount of movement of the imaging system is outside the predetermined movement range relative to the initial position of the imaging system.

16. An imaging system according to claim 9, wherein the movement sensor provides a signal to indicate that the determined amount of movement of the imaging system is within the predetermined movement range so as to cause the image sensor to attain said first exposure during the first time period and so as to cause the image sensor to attain said second exposure during the second time period.

17. An imaging system, comprising:

means for sensing an image;

means for exposing a projected image on the image sensing means during an exposure period so as to allow the image sensing means to attain at least two exposures;

means for sensing movement of the imaging system, during the exposure period, in order to determine an amount of movement of the imaging system relative to an initial position of the imaging system in the exposure period; and means for constructing an image based on at least a first exposure and a second exposure, wherein the first exposure is attained during a first time period, within the exposure period, in which the determined amount of movement of the imaging system is within a predetermined movement range relative to the initial position of the imaging system, the second exposure is attained during a second time period, within the exposure period, in which the determined amount of movement of the imaging system is within the predetermined movement range relative to the initial position of the imaging system, and between the first time period and the second time period there is a third time period in which the determined amount of movement of the imaging system is outside the predetermined movement range relative to the initial position of the imaging system.

18. An imaging system according to claim 17, further comprising means for capturing at least two image frames for constructing the acquired image.

19. An imaging system according to claim 18, further comprising:

means for selecting the captured image frames for constructing the acquired image.

20. An imaging system according to claim 17, further comprising:

means for preventing the projected image from forming an exposure, during the third time period, when the determined amount of movement of the imaging system is outside the predetermined movement range relative to the initial position of the imaging system.

*21. A method for constructing an image, comprising:*

*beginning an exposure cycle when a shutter button activation of an imaging system is detected;*

*sensing movement of the imaging system during the exposure cycle for obtaining an amount of movement of the imaging system relative to an initial position of the imaging system;*

*capturing a plurality of frames of a same scene during the exposure cycle;*

*for each captured frame of the plurality of captured frames:*

*determining whether a corresponding amount of movement of the imaging system during the capturing is within a predetermined movement range;*

*responsive to a determination that the corresponding amount of movement is within the predetermined movement range, labeling the captured frame of the same scene with a first identifier, the first identifier indicating that the captured frame is not to be discarded; and*

*responsive to a determination that the corresponding amount of movement is not within the predetermined movement range, labeling the captured frame of the same scene with a second identifier, the second identifier indicating that the captured frame is to be discarded; and*

*constructing an image of the same scene based on at least one captured frame of the same scene that is labeled with the first identifier after discarding at least one captured frame of the same scene that is labeled with the second identifier.*

*22. The method of claim 21, wherein a length of the exposure cycle varies with illumination.*

*23. The method of claim 21, wherein the amount of movement of the imaging system is determined using a subset of pixels on the image sensor.*

*24. The method of claim 21, wherein the amount of movement of the imaging system is determined by a motion sensing component.*

*25. A method for constructing an image, comprising:*

*beginning an exposure cycle when a shutter button activation of an imaging system is detected;*

*sensing movement of the imaging system during the exposure cycle for obtaining an amount of movement of the imaging system relative to a fixed reference point;*

*controlling the imaging system such that an image sensor is effectively exposed when the amount of movement of the imaging system is within a predetermined movement range relative to the fixed reference point, the image sensor is not effectively exposed when the amount of movement of the imaging system is not within the predetermined movement range relative to the fixed reference point, and the image sensor is effectively re-exposed when the amount of movement of the imaging system is back within the predetermined movement range relative to the fixed reference point; and*

*constructing an image based at least one exposure, each exposure obtained when the image sensor is one of exposed and re-exposed during the exposure cycle.*

*26. The method of claim 25, wherein a frame is captured for each exposure, and the image is constructed based on the captured frames.*

*27. The method of claim 25, wherein the image is constructed by accumulating pixel intensities that were accumulated during each exposure.*

*28. The method of claim 25, wherein the image sensor is not effectively exposed by controlling at least one of a mechanical shutter, an optical shutter, and at least one electronic element within the image sensor.*

*29. The method of claim 25, wherein a length of the exposure cycle varies with illumination.*

*30. The method of claim 25, wherein the amount of movement of the imaging system is determined using a subset of pixels on the image sensor.*

*31. The method of claim 25, wherein the amount of movement of the imaging system is determined by a motion sensing component.*

*32. An imaging system, comprising:*

*a movement sensor for sensing movement of the imaging system during an exposure cycle to obtain an amount of movement of the imaging system relative to an initial position of the imaging system, the initial position determined a beginning of the exposure cycle, and the exposure cycle beginning when a shutter button activation of the imaging system is detected;*

*an image sensor for capturing a plurality of frames of a same scene during the exposure cycle;*

*a processor is configured, for each captured frame of the plurality of captured frames, to:*

*determine whether a corresponding amount of movement of the imaging system during the capturing is within a predetermined movement range;*

*responsive to a determination that the corresponding amount of movement is within the predetermined movement range, label the captured frame of the same scene with a first identifier, the first identifier indicating that the captured frame is not to be discarded; and*

*responsive to a determination that the corresponding amount of movement is not within the predetermined movement range, label the captured frame of the same scene with a second identifier, the second identifier indicating that the captured frame is to be discarded; and*

*control an overall operation of the imaging system and construct an image of the same scene based on at least one captured frame of the same scene that is labeled with the first identifier after discarding at least one captured frame of the same scene that is labeled with the second identifier.*

*33. The imaging system of claim 32, wherein a length of the exposure cycle varies with illumination.*

*34. The imaging system of claim 32, wherein the amount of movement of the imaging system is determined using a subset of pixels on the image sensor.*

*35. The imaging system of claim 32, wherein the amount of movement of the imaging system is determined by a motion sensing component.*

*36. An imaging system, comprising:*

*a movement sensor for sensing movement of the imaging system during an exposure cycle to obtain an amount of movement of the imaging system relative to a fixed reference point, the exposure cycle beginning when a shutter button activation of the imaging system is detected;*

*a processor configured to:*

*control the imaging system such that that an image sensor is effectively exposed when the amount of movement of the imaging system relative to the fixed reference point is within a predetermined movement range, the image sensor is not effectively exposed when the amount of movement of the imaging system relative to the fixed reference point is not within the predetermined movement range, and the image sensor is effectively re-exposed when the amount of movement of the imaging system relative to the fixed reference point is back within the predetermined movement range, and*

*construct an image based at least one exposure, each exposure obtained when the image sensor is one of exposed and re-exposed during the exposure cycle.*

*37. The imaging system of claim 36, wherein a frame is captured for each exposure, and the processor constructs the image based on the captured frames.*

*38. The imaging system of claim 36, wherein the process constructs the image by accumulating pixel intensities that were accumulated during each exposure.*

*39. The imaging system of claim 36, wherein the image sensor is not effectively exposed by controlling at least one of a mechanical shutter, an optical shutter, and at least one electronic element within the image sensor.*

*40. The imaging system of claim 36, wherein a length of the exposure cycle varies with illumination.*

*41. The imaging system of claim 36, wherein the movement sensor determines the amount of movement of the imaging system based on a subset of pixels on the image sensor.*

*42. The imaging system of claim 36, wherein the amount of movement of the imaging system is determined by a motion sensing component.*

* * * * *